(12) United States Patent
Nanko et al.

(10) Patent No.: US 6,322,037 B1
(45) Date of Patent: Nov. 27, 2001

(54) MOVING MIRROR SUPPORT DEVICE FOR PHOTO-INTERFEROMETER

(75) Inventors: Tomoaki Nanko; Hisanori Hayashi; Minoru Otsubo; Katsumi Isozaki, all of Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 09/676,592

(22) Filed: Sep. 29, 2000

(30) Foreign Application Priority Data

Oct. 26, 1999 (JP) .................................................. 11-304213

(51) Int. Cl.[7] .................................................... A47G 1/24
(52) U.S. Cl. ............................................ 248/478; 248/550
(58) Field of Search .................................... 248/478, 476, 248/475.1, 466, 468, 550; 359/871, 872

(56) References Cited

U.S. PATENT DOCUMENTS 5,505,282 * 4/1996 Olgac ................................. 248/550 X

FOREIGN PATENT DOCUMENTS 40 279 889 A * 10/1992 (JP) .
02000 111311 A * 4/2000 (JP) .

* cited by examiner

*Primary Examiner*—Ramon O. Ramirez
(74) *Attorney, Agent, or Firm*—Moonray Kojima

(57) ABSTRACT

A moving mirror support device for use with photo-interferometers having first leaf springs arranged in parallel with one end thereof being fixed to a base; a coupling plate fixed to the other ends of the first leaf springs; and second leaf springs arranged in parallel with each of the first springs with one end thereof being fixed to the coupling plate and the other end being fixed to the moving mirror, whereby longitudinal and transverse displacements of the moving mirror can be more accurately controlled.

6 Claims, 6 Drawing Sheets

(a)

(b)

(a)

(b)

US 6,322,037 B1

MOVING MIRROR SUPPORT DEVICE FOR PHOTO-INTERFEROMETER

BACKGROUND OF THE INVENTION

1. Field of Invention

This invention relates to a moving mirror support device for use in, for example, photo-interferometers, and more particularly, to an improvement therein for improving operation thereof.

2. Description of the Prior Art

In spectral analyzers or various measuring instruments using photo-interferometers, moving accuracy of the order of μm is required of the moving mirror support device. However, if such instruments are used at a plant site, there is the problem of inability to attain high accuracy of measurement due to various environmental influences, such as vibration. In order to solve this problem, in the prior art, the rigidity of a moving mirror support device in directions other than the moving direction thereof was enhanced by arranging a pair of leaf springs to be parallel to each other.

FIG. 1 shows a Michelson interferometer, which is commonly used as a spectrometer in a spectral analyzer, wherein a light beam from light source 1 is changed to a parallel light by collimating lens 2, then divided into two directions with beam splitter 3. Moving mirror 4 and fixed mirror 5 return each light beam back to beam splitter 3 in opposite directions, and the return light beams are superimposed on beam splitter 3. The physical properties of the measured object (not shown) are measured by using the optical interference generated by the superimposed light beams.

FIG. 2(a) shows a conventional support device for a moving mirror used in such an interferometer, wherein moving mirror 4 is suspended from an upper position by two leaf springs 11 mounted on base 10 parallel to each other. Suspension by two leaf springs can suppress rotational motion generated when the moving mirror 4 is operated. If such an interferometer is used in a spectral analyzer, the moving mirror is driven transversely by a voice coil motor (not shown) about 0.3 mm and at 8 Hz. In such case, it is necessary to increase the amplitude (i.e. movement in the transverse direction) of the moving mirror in order to improve the resolution of the analyzer. However, by increasing the amplitude of the moving mirror 4, deformation of the two leaf springs 11 becomes large, as shown in FIG. 2(b), and the moving mirror is displaced transversely and longitudinally. Thus, the problem of longitudinal displacement arises and the optical axis of the return light will be shifted.

SUMMARY OF THE INVENTION

Accordingly, an object of the invention is to solve the foregoing and other problems, disadvantages and deficiencies of the prior art.

Another object is to provide a moving mirror support device, such as used in photo-interferometers, that has no longitudinal displacement when the transverse amplitude is increased.

The foregoing and other objects are attained by the invention which encompasses a moving mirror support device that has a plurality of first leaf springs arranged in parallel and held at a predetermined distance, one end of each leaf spring being fixed to a base; a coupling plate fixed to other ends of the first leaf springs; and a plurality of second leaf springs, each being arranged in parallel with each of the first leaf springs, one end of each being fixed to the coupling plate and the other end being fixed to the moving mirror.

Advantageously, the invention device eliminates displacement of the moving mirror in the longitudinal direction even when the transverse direction amplitude is increased.

In another embodiment, a damper is further provided to regulate the movement of the coupling plate, thereby enabling increased stability of the moving mirror.

In a further embodiment, control devices are added which control vibrations of the coupling plate based on signals from a position detecting device that senses displacement of the coupling plate and/or moving mirror. These added features further increase the stability of the moving mirror.

DETAILED DESCRIPTION OF THE PREFERRED EMBODIMENTS

Figure 1:
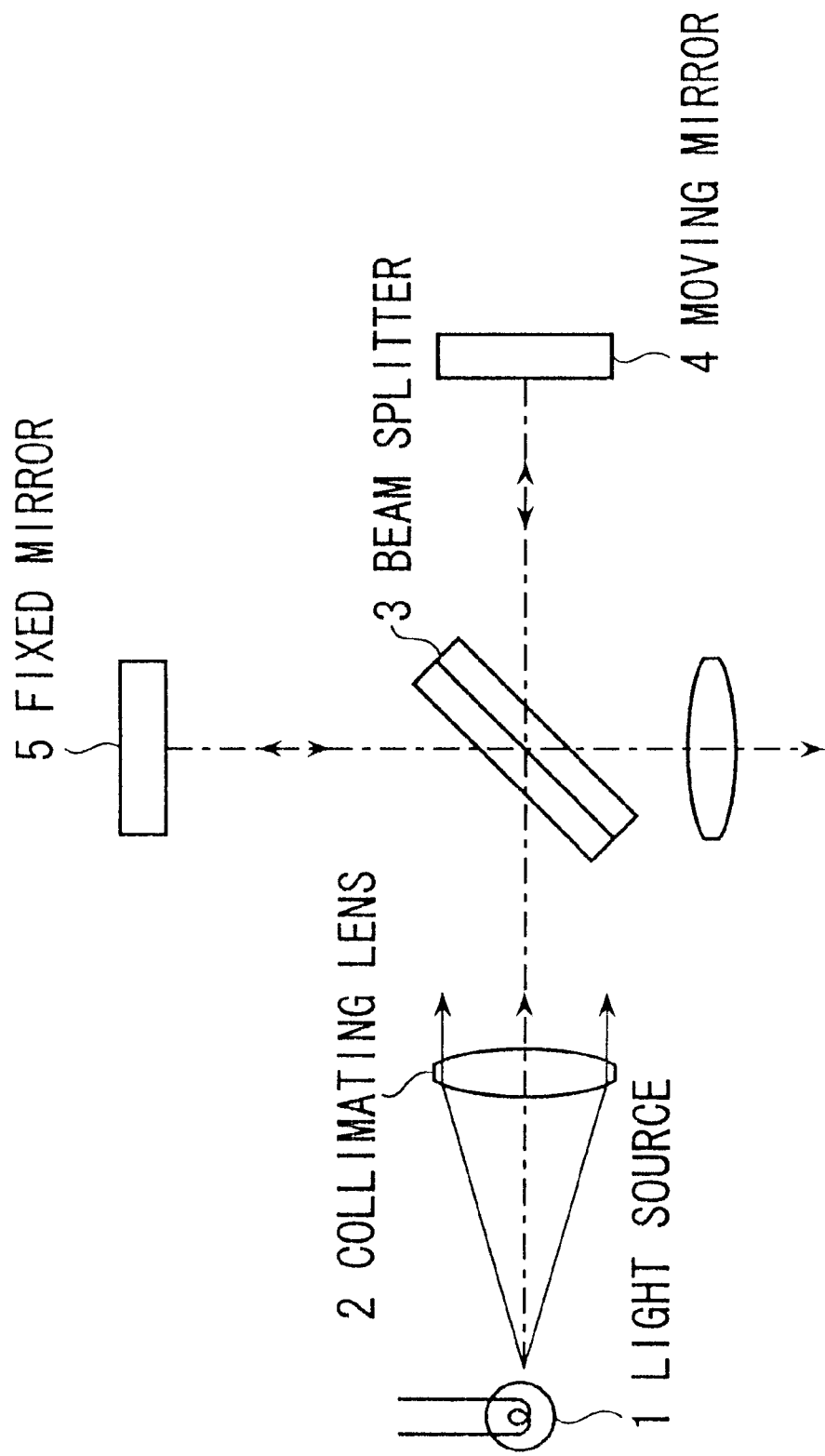
FIG. 1 is a drawing depicting an example of a conventional interferometer used for spectral analysis.
Figure 2:
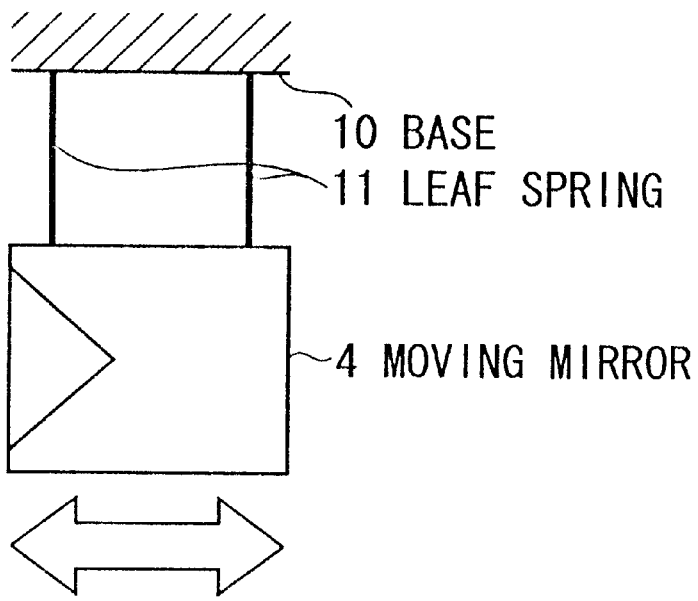
FIG. 2 is a side view depicting a conventional moving mirror support device used for photo-interferometers.
Figure 2:
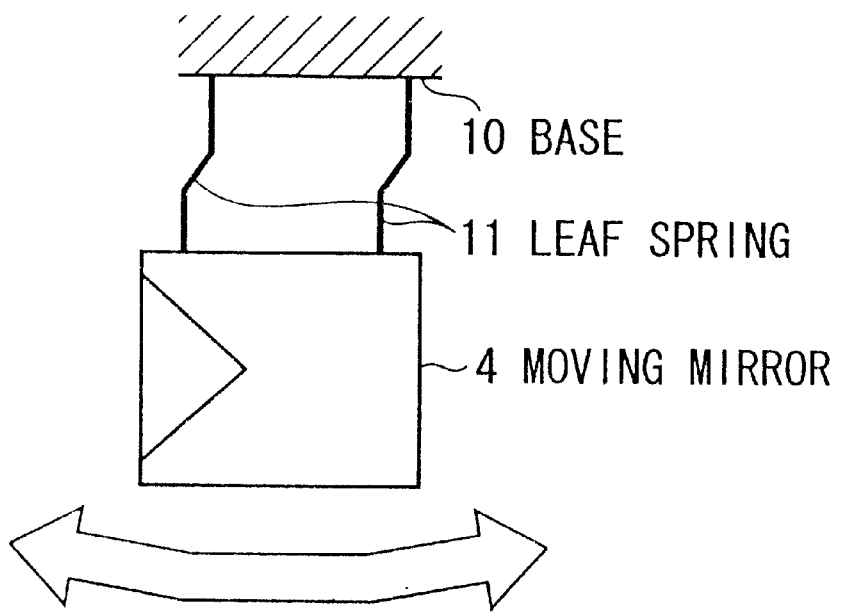
Figure 3:
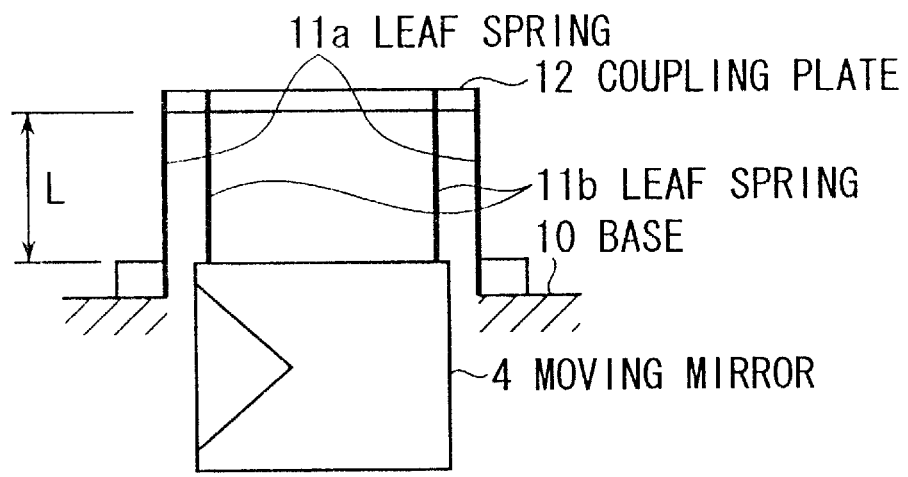
FIG. 3 is a side view depicting a first illustrative embodiment of the invention.
Figure 3:
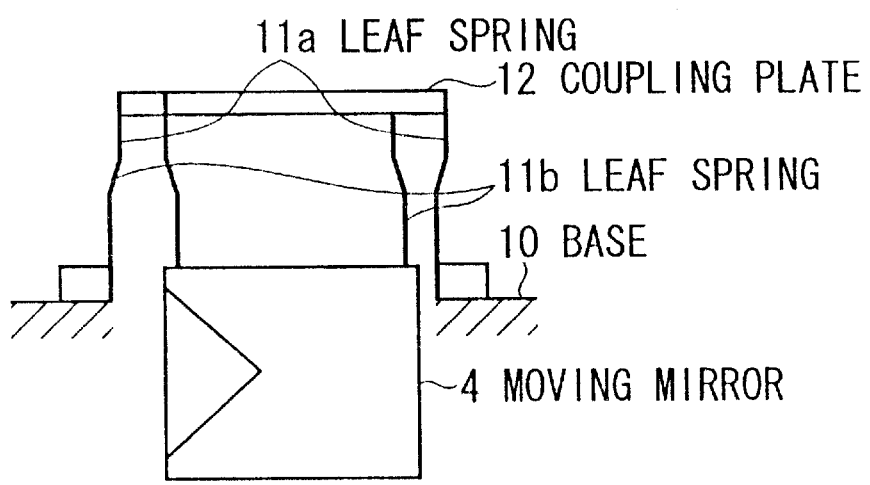
Figure 3:
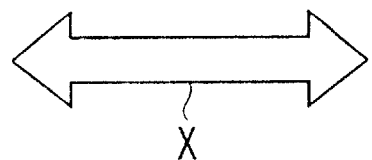

The embodiment depicted in FIG. 3(a) comprises four leaf springs 11a and 11b that have the same shape and nearly the same elastic modulus. One end of each of the outer two first leaf springs 11a is fixed to base 10 vertically and the other end thereof is fixed to each end of coupling plate 12, respectively, thereby to support coupling plate 12 horizontally. One end of each of the two inner second leaf springs 11b is fixed to coupling plate 12, and moving mirror 4 is fixed to the other end of each of leaf springs 11b thereby supporting or suspending moving mirror 4. Each of both leaf springs 11a and 11b (i.e. each pair) is formed in parallel with each other and held at a predetermined distance so that all of the leaf springs have an effective length L.

FIG. 3(b) shows the state in which a force of large amplitude, for example, amplitude of about 3 mm at 2 Hz, is applied to moving mirror 4 in a transverse direction (see arrow X), such as by use of a voice coil motor (not shown). In this case, the outer first leaf springs 11a and the inner second springs 11b are bent in the longitudinal direction by early equal amounts so that movement of the moving mirror 4 upward or downward does not occur. That is, moving mirror 4 is moved linearly (i.e. in the direction of arrow X) and interference light is obtained accurately and reliably without shifting the optical axis of the return light.

Figure 4:
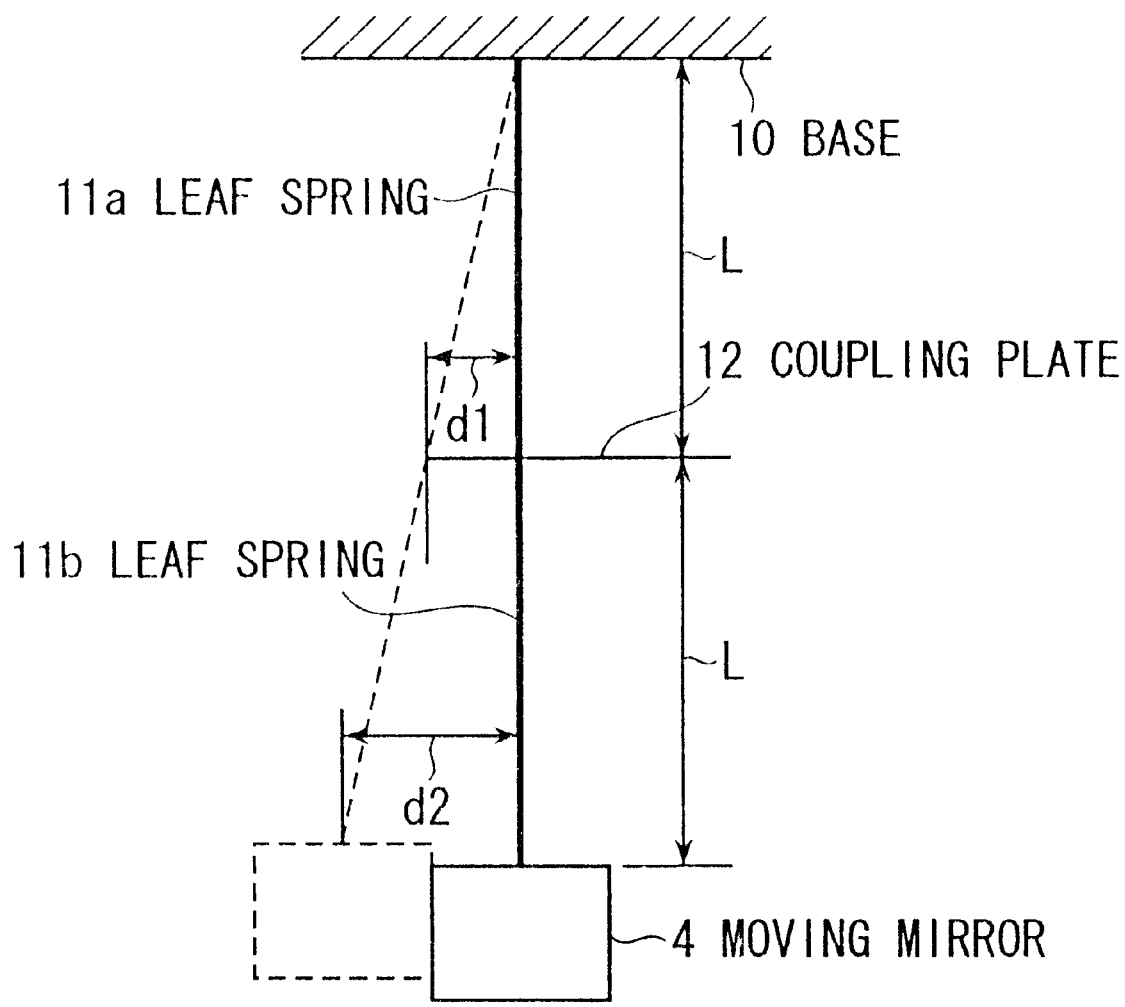
FIG. 4 is a drawing useful for explaining movement of the leaf springs of the embodiment of FIG. 3.

FIG. 4 is useful in explaining the movement of the leaf springs of the support device of FIGS. 3(a) and 3(b). When moving mirror 4 is moved, for example in the direction of the dotted lines, the moving distance d2 of moving mirror 4 becomes twice that of the moving distance of the coupling plate 12, (i.e. d1×2). However, the ratio of these movements is not always maintained accurately due to vibration of the leaf springs and highly accurate amplitudes (i.e. transverse motion of the moving mirror 4) cannot always be maintained. As a result, although the foregoing first embodiment is a substantial improvement over the prior art when considered by itself, further improvements are made by other embodiments of the invention, as will be discussed hereinbelow.

Figure 5:
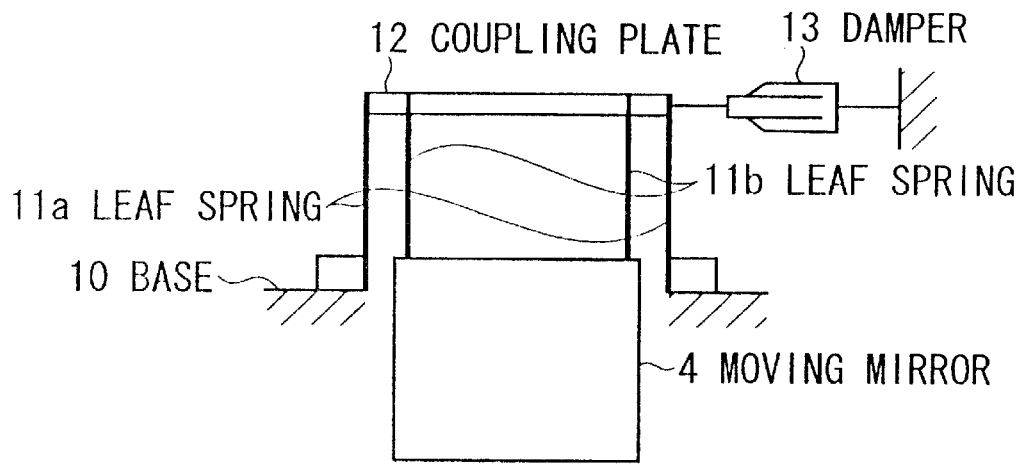
FIG. 5 is a side view depicting a second illustrative embodiment of the invention.

FIG. 5 shows a support device which further improves the first illustrative embodiment, wherein a damper 13 is provided to regulate the motion or movement of the coupling plate 12 to suppress vibrations the leaf springs 11a and 11b. Damper 13 is connected to the side of coupling plate 12 as depicted. The ratio of displacements of coupling plate 12 and moving mirror 4 is shifted due to the presence of damper 13, and upward and downward displacements are generated in moving mirror 4. However, in the device, contact is achieved using a suitable force such that the displacement does not affect the accuracy of the supporting device for the moving mirror. As discussed, vibration, generated when moving mirror 4 is driven, can be suppressed by use of the damper 13 contacting the coupling plate 12 thereby to control motion thereof.

Figure 6:
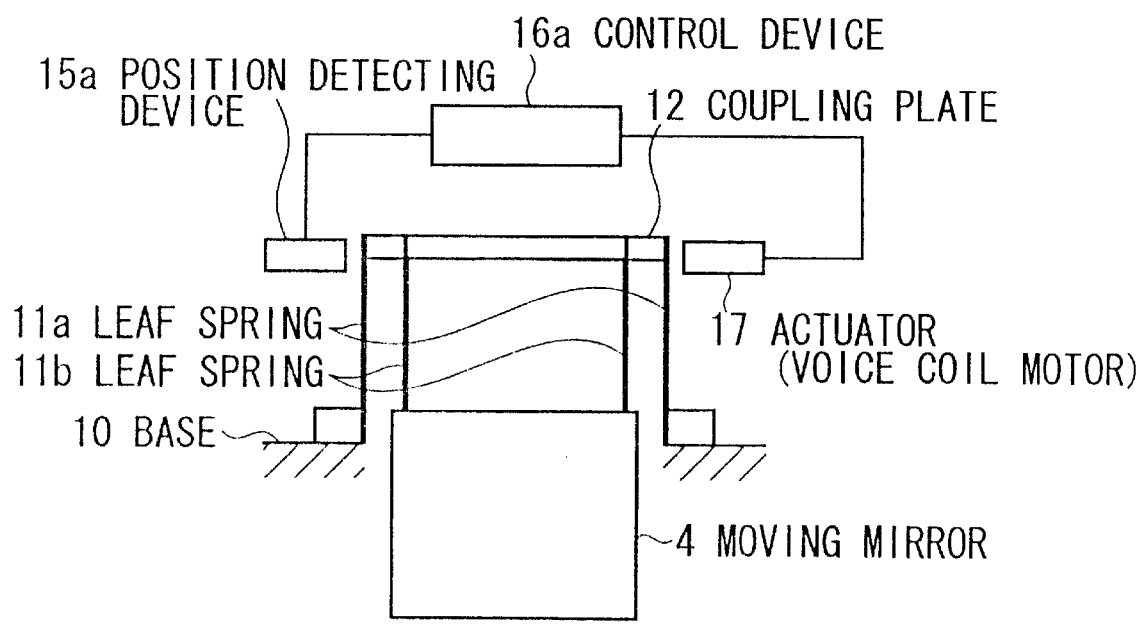
FIG. 6 is a side view depicting a third illustrative embodiment of the invention.

FIG. 6 shows a third illustrative embodiment wherein a position detecting device 15 is mounted on the side of coupling plate 12, and the vibration of leaf springs 11a and 11b, generated when moving mirror 5 is driven (such as by a driving means, not shown), is suppressed by a control device 16a, which operates to control the vibration of the leaf springs 11a and 11b, based on signals from the position detecting device 15a. Control signals are sent from the control device 16a to the actuator or voice coil motor 17 thereby to effect control supression of coupling plate 12 so that movement thereof becomes one half (½) of the movement of the moving mirror 4.

Figure 7:
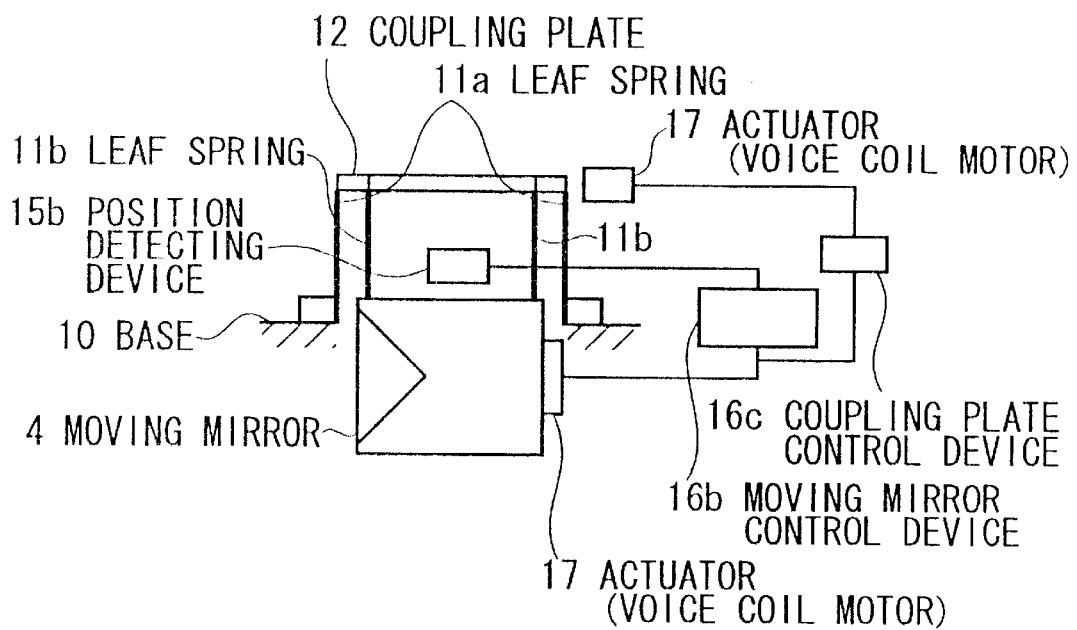
FIG. 7 is a side view depicting a fourth illustrative embodiment of the invention.

FIG. 7 shows a fourth illustrative embodiment, wherein a position detecting device 15b is provided to monitor the displacement of the moving mirror 4. Moving mirror 4 is driven by moving mirror control device 16b based on signals obtained from the position detecting device 15b with control signals being sent to a first actuator 17 (also labelled voice coil motor). Another control device 16c is used to control suppression of movement of the coupling plate 12 based on signals from the position detecting device 15b via control device 16b, as shown. The suppression is accomplished by the second actuator 17 (also called voice coil motor), in the same manner as in FIG. 6. This embodiment provides stable operation as in the the embodiment of FIG. 6.

Figure 8:
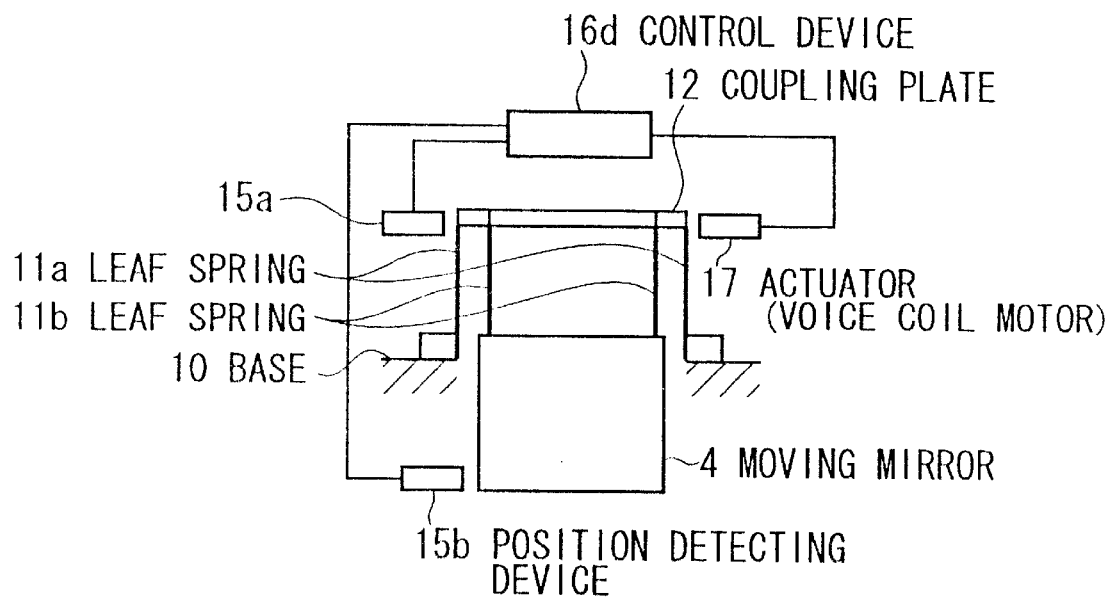
FIG. 8 is a side view depicting a fifth illustrative embodiment of the invention.

FIG. 8 shows a fifth illustrative embodiment, wherein a plate position detecting device 15a and a mirror position detecting device 15b are connected to the control device 16. Responsive to signals from one or both of the position detecting devices 15a and 15b, the control device 16d provides control signals to the actuator or voice coil motor 17 thereby to suppress motion of the coupling plate 12. It is noted that there is no actuator 17 or voice coil motor shown to move the mirror 4. However, as in all of the other embodiments, it is to be understood that such means for moving the mirror 4 is provided to control such moving mirror 4.

In all of the embodiments, the devices 17 accurately control the amplitude ratios of the movement of the coupling plate 12 and the movement of the moving mirror so as to more accurately control the linear displacement. In the embodiment of FIG. 8, the displacement of the coupling plate 12 is in a predetermined ratio of 1:2 with respect to the moving mirror. This is accomplished, as in the other embodiments by the control device receiving signals from the position detectors which measure the displacements of the coupling plate and/or moving mirror and in response thereby control the movement or suppression of movement of the coupling plate and/or moving mirror.

The foregoing description is merely illustrative of the principles of the invention. Various extensions and modifications thereof would be apparent to the worker skilled in the art. It is understood that all such extensions and modifications are to be considered to be within the spirit and scope of the invention.

For example, the moving distance and moving periodicity (Hz) or mounting positions of the components can be changed as desired. It is sufficient that upward and/or downward displacement not be caused due to transverse amplitudes. Moreover, the invention is not limited to use in spectral analyzers. For example, the invention can be used in wavelength measuring devices, OTDR devices, etc.

As described above and in the claims, mounting two sets of pairs of leaf springs allows the moving mirror to perform linear motion even when its moving distance is lengthened and resolution of spectral analyzers is improved. Moreover, as described above and in the claims, providing. a damper to contact the coupling plate suppresses vibrations of the leaf springs which are generated when driving the moving mirror. This provides greatly increased stability of operation. Finally, as described above and in the claims, monitoring the displacement of the coupling plate and/or moving mirror and controlling the vibrations thereof selectively using a control device also suppresses vibration of the leaf springs generated when driving the moving mirror, provides increased stability of operation.

What is claimed is:

1. A moving mirror support device comprising:
a plurality of first leaf springs arranged in parallel and held at a predetermined distance from each other, one end of each of said first leaf springs being fixed to a base;
a coupling plate fixed to another end of each of said first leaf springs; and
a plurality of second leaf springs arranged in parallel with each of said first leaf springs, one end of each of said second leaf springs being fixed to said coupling plate, and another end thereof being fixed to a moving mirror.

2. The device of claim 1, further comprising damper means for regulating motion of said coupling plate.

3. The device of claim 1, wherein said first leaf springs and said second leaf springs have effective lengths which are designed to have the same lengths.

4. The device of claim 1, further comprising position detecting means for sensing displacement of said coupling plate; and control means for controlling vibration of said coupling means based on a signal from said position detecting means.

5. The device of claim 1, further comprising position detecting means for sensing displacement of said moving mirror; and control means for controlling vibration of said coupling plate based on a signal from said position detecting means.

6. The device of claim 1, further comprising a plurality of position detecting means for sensing displacements of said moving mirror and said coupling plate, respectively; and control means for controlling vibration of said coupling plate based on respective plurality of signals from said position detecting means.

* * * * *